(12) United States Patent
Devlin et al.

(10) Patent No.: US 7,253,231 B2
(45) Date of Patent: Aug. 7, 2007

(54) GRAFTED MULTI-FUNCTIONAL OLEFIN COPOLYMER VI MODIFIERS AND USES THEREOF

(75) Inventors: Cathy C. Devlin, Richmond, VA (US); Charles A. Passut, Midlothian, VA (US); Joe S. Bradley, Midlothian, VA (US); Michael A. Danylo, Midlothian, VA (US); Yoon Song, Richmond, VA (US); Sanjay Srinivasan, Midlothian, VA (US); Zhaoyao Joe Qiu, Baton Rouge, LA (US); Errol Joseph Olivier, Baton Rouge, LA (US); Patric Meessen, La Calamine (BE); Gerhard Van Vliet, Maastricht (NL); Gerardus Arnoldus Rademakers, Heerlen (NL); Johannes Hendrik Geesink, Schinnen (NL)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 11/047,067

(22) Filed: Jan. 31, 2005

(65) Prior Publication Data

US 2006/0173135 A1    Aug. 3, 2006

(51) Int. Cl.
*C08F 255/00* (2006.01)
*C08F 255/02* (2006.01)
*C08L 51/06* (2006.01)

(52) U.S. Cl. .................... 525/64; 525/69; 525/285; 525/301; 525/326.1; 525/293; 525/375; 508/225; 508/231

(58) Field of Classification Search ............ 525/64, 525/69, 285, 301, 326.1, 293, 375; 508/225, 508/231
See application file for complete search history.

(56) References Cited

U.S. PATENT DOCUMENTS

| | | | |
|---|---|---|---|
| 3,862,265 A | 1/1975 | Steinkamp et al. |
| 4,089,794 A | 5/1978 | Engel et al. |
| 4,137,185 A | 1/1979 | Gardiner et al. |
| 4,144,181 A | 3/1979 | Elliott et al. |
| 4,146,489 A | 3/1979 | Stambaugh et al. |
| 4,160,739 A | 7/1979 | Stambaugh et al. |
| 4,320,019 A | 3/1982 | Hayashi |
| 4,340,689 A | 7/1982 | Joffrion |
| 4,357,250 A | 11/1982 | Hayashi |
| 4,382,007 A | 5/1983 | Chafetz et al. |
| 4,780,228 A | 10/1988 | Gardiner et al. |
| 4,863,623 A | 9/1989 | Nalesnik |
| 5,055,213 A | 10/1991 | Germanaud et al. |
| 5,075,383 A | 12/1991 | Migdal et al. |
| 5,162,086 A | 11/1992 | Migdal et al. |
| 5,169,546 A | 12/1992 | Nalesnik et al. |
| 5,188,745 A | 2/1993 | Migdal et al. |
| 5,207,938 A | 5/1993 | Nalesnik |
| 5,262,075 A | 11/1993 | Chung et al. |
| 5,312,556 A | 5/1994 | Chung et al. |
| 5,384,371 A | 1/1995 | Caines et al. |
| 5,391,617 A | 2/1995 | Olivier et al. |
| 5,427,702 A | 6/1995 | Chung et al. |
| 5,429,757 A | 7/1995 | Mishra et al. |
| 5,451,636 A | 9/1995 | Olivier et al. |
| 5,516,849 A | 5/1996 | Caines et al. |
| 5,556,923 A | 9/1996 | Caines et al. |
| 5,563,118 A | 10/1996 | Mishra et al. |
| 5,721,200 A | 2/1998 | Shirodkar et al. |
| 5,837,773 A | 11/1998 | Olivier et al. |
| 5,932,525 A | 8/1999 | Ney et al. |
| 6,107,257 A | 8/2000 | Valcho et al. |
| 6,284,716 B1 | 9/2001 | Gunther et al. |
| 6,715,473 B2 | 4/2004 | Ritchie et al. |
| 6,767,871 B2 * | 7/2004 | Devlin et al. ............... 508/371 |
| 2001/0025094 A1 | 9/2001 | Gunther et al. |
| 2004/0043909 A1 | 3/2004 | Goldblatt et al. |
| 2004/0259742 A1* | 12/2004 | Mishra et al. ............... 508/231 |

(Continued)

FOREIGN PATENT DOCUMENTS

EP    0 515 152 A    11/1992

(Continued)

OTHER PUBLICATIONS

Mark T. Devlin, et al., "Film Formation Properties of Polymers in the Presence of Abrasive Contaminants," Society of Automotive Engineers, Inc., 2002-01-2793, pp. 1-9.

(Continued)

*Primary Examiner*—James J. Seidleck
*Assistant Examiner*—Olga Asinovsky
(74) *Attorney, Agent, or Firm*—John H. Thomas, P.C.

(57) ABSTRACT

A novel highly grafted, multi-functional olefin copolymer is provided comprising an additive reaction product of a method comprising reacting acylating agent with an olefin copolymer having a number average molecular weight greater than about 1,000 in the presence of a free radical initiator and essentially free of hydrocarbon solvent in an extruder to provide an olefin copolymer intermediate comprising an acylated olefin copolymer having a degree of grafting (DOG) of at least 0.5 wt. %, which copolymer intermediate's molecular weight is reduced, vacuum stripped of unreacted components, pelletized, dissolved in a neutral oil (preferably with inert gas sparging), and further reacted with a polyamine to provide a grafted multi-functional olefin copolymer viscosity modifier, and lubricating oil concentrates and compositions containing the same and uses thereof.

16 Claims, 2 Drawing Sheets

U.S. PATENT DOCUMENTS

2006/0003905 A1  1/2006  Devlin et al.

FOREIGN PATENT DOCUMENTS

| EP | 0 922 752 A | 6/1999 |
|---|---|---|
| EP | 0922752 A2 | 6/1999 |
| EP | 1 533 293 A2 | 5/2005 |
| EP | 1 533 293 A3 | 5/2005 |
| EP | 1533293 A2 | 5/2005 |
| EP | 1 553 115 A2 | 7/2005 |
| EP | 1 553 115 A3 | 7/2005 |
| EP | 1553115 A2 | 7/2005 |

OTHER PUBLICATIONS

European Search Report, Application No. 06250505.2-2109 dated Jun. 9, 2006.

Australian Patent Office Search Report and Written Opinion; Application No. SG 200600604-3 mailed Oct. 11, 2006.

* cited by examiner

GRAFTED MULTI-FUNCTIONAL OLEFIN COPOLYMER VI MODIFIERS AND USES THEREOF

TECHNICAL FIELD

This invention relates in one embodiment to a highly grafted, multi-functional lubricant additive useful as an improved viscosity index modifier when employed in a lubricating oil composition.

BACKGROUND OF THE DISCLOSURE

The art contains many disclosures on the use of polymer additives in lubricating oil compositions. Ethylene propylene copolymers and ethylene-alpha olefin nonconjugated diene terpolymers which have been further derivatized to provide bifunctional properties in lubricating oil compositions illustrate this type of oil additive.

U.S. Pat. No. 4,089,794 discloses ethylene copolymers derived from ethylene and one or more $C_3$ to $C_{28}$ alphaolefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene propylene copolymer or an ethylene-propylene-diene modified terpolymer with a graph monomer of C-vinyl-pyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a C3-C8 alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoaminepolyamine mixture.

U.S. Pat. No. 4,382,007 discloses a dispersant-VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. Pat. No. 5,932,525 teaches multi-grade lubricating oils comprising a low saturate base stock, less than three mass percent of an ash less dispersant and a viscosity modifier.

U.S. Pat. No. 5,427,702 discloses mixed ethylene alpha olefin copolymer multifunctional viscosity modifiers.

U.S. Pat. No. 4,863,623 teaches multifunctional olefin copolymer VI improvers.

U.S. Pat. No. 5,075,383 discloses a process for preparing a dispersant and antioxidant olefin copolymer additives, wherein free radical grafting is accompanied by the molecular weight reduction of the copolymers due to mechanically shearing.

U.S. Pat. No. 5,556,923 discloses oil solutions of adducted derivatized EPR or EPDM.

In one conventional process, a grafted olefin copolymer VI improver is synthesized by grafting maleic anhydride or other dicarboxylic anhydride on an olefin copolymer in the presence of an alkane solvent, e.g., hexane, or similar hydrocarbon solvent. However, certain solvents, such as alkanes (e.g., hexane) in particular, can undesirably participate in side reactions during the grafting reaction to form undesired side products, such as grafted alkyl succinic anhydrides, which represent impurities in the end product. Also, relatively higher amounts of transient unfunctionalized polymer (ungrafted polymer) can be present after grafting in solvent-based grafting reactions, which reduces the useful activity level of the product.

Emission requirements for all vehicles have become increasingly more stringent. For instance, diesel engine design changes required to meet emission requirements have led to increased levels of soot in engine lubricants. This increased level of soot causes increased wear when oils are not properly formulated. In particular, with the arrival of new exhaust gas recirculation or recycle (hereinafter "EGR") cooled engines including cooled EGR engines, a problem has developed in the ability of the conventional lubricating oils to handle the resulting increased soot loading. These new engines also have more stringent NOx emission standards. It has been noted in field testing of certain Mack and Detroit Diesel trucks that the engine oils tested in the cooled EGR prototype engines exhibit undesirably excessive oil thickening because of the way soot is being generated. Increasing the treat rate of the standard dispersants in the lubricating oils has not solved the problem. It has been suggested that oils having the capability to form films that are thicker than the size of primary soot particles may be able to prevent or reduce this source of abrasive wear.

U.S. Pat. No. 6,715,473 describes the use of certain olefin copolymers containing alkyl or aryl amine, or amide groups, nitrogen-containing heterocyclic groups or ester linkages in lubricating oil compositions used in EGR equipped heavy duty diesel engines.

Advanced olefin polymer dispersant viscosity index improvers are needed and desired for use in lubricating oils which provide improvements in film formation properties, and deposit and soot control, in lubricants used in internal combustion engines, such as diesel engines and EGR engines in particular.

SUMMARY OF EMBODIMENTS

The novel highly grafted, multi-functional olefin copolymer of one embodiment of the present disclosure comprises an additive reaction product of a method comprising reacting acylating agent with an olefin copolymer having a number average molecular weight range of about 1,000 to 500,000 in the presence of a free radical initiator and essentially free of hydrocarbon solvent in an extruder to provide a copolymer intermediate comprising an acylated olefin copolymer having a degree of grafting (DOG) of the acylating agent on the copolymer intermediate of at least 0.5 wt. %, and wherein the copolymer intermediate, if needed, is reduced in number average molecular weight by either mechanical, thermal, chemical or a combination of thereof. The copolymer intermediate is, in another embodiment of the present disclosure, vacuum stripped of unreacted components, pelletized, dissolved in a neutral oil, and further reacted with an amine to provide a grafted multi-functional olefin copolymer useful as, for example, a viscosity modifier for lubricating oils.

The invention further relates to a process for the preparation of an additive reaction product by the method described in claim 25.

The acylated, reduced copolymer may be vacuum stripped of unreacted components, pelletized, dissolved in a neutral oil, and further reacted with an amine to provide a grafted multi-functional olefin polymer viscosity modifier.

A further advantage and improvement is realized upon dissolving the pelletized polymer intermediate in solvent neutral oil to form a solution, which preferably is sparged with an inert gas sufficient to remove moisture, thereby converting polymeric succinic diacid back into the active polymeric succinic anhydride form, prior to amination. This makes it possible to conduct the amination faster thereafter on the dissolved and presparged polymer intermediate to provide a more highly functionalized and high purity finished additive product. In addition, the vacuum stripping of the polymer intermediate conducted before pelletization removes unreacted components, such as unreacted graft monomers and initiator decomposition products, which otherwise would contaminate the end product and/or, in the case of the unreacted graft monomer, lead to undesired side reaction products during the subsequent amination reaction. Therefore, additive end products having higher activities are provided by embodiments of the present invention.

Among other advantages, the grafted multi-functional olefin copolymer viscosity modifiers made according to one embodiment of the present disclosure have reduced impurity levels and thus higher purity. For instance, the olefin copolymer can in one embodiment be reacted with the acylating agent in an essentially solventless manner in an extruder, i.e., in the presence of less than 0.1 wt. % of volatile hydrocarbon solvent, thereby avoiding side reaction products arising from the solvent.

Consequently, the additive reaction products of certain embodiments of the present disclosure can contain reduced levels of impurities and contaminants (i.e., unreacted reactants, side reaction products and reaction by-products). The impurity levels can be reduced to less than 0.1 wt. % total in the additive reaction product. Therefore, additive end products having higher activities are provided by such embodiments of the present disclosure.

Novel lubricant compositions of the present disclosure also are provided comprising an oil of lubricating viscosity and an effective amount of the highly grafted, multi-functional olefin copolymer reaction product (i.e., the additive reaction product), in the form of additive concentrates or finished lubricants. These lubricant compositions can be used to lubricate internal combustion engines (e.g., heavy duty diesel engines, including types equipped with exhaust gas recirculator (EGR) systems), automotive vehicle transmissions, gears and other mechanical devices and components. Lubricant compositions containing the additive reaction product of certain embodiments of the present disclosure have improved soot dispersing (deagglomeration), deposit control, and boundary film formation performance. The improved boundary film formation performance in soot-containing oils aids in protecting against engine wear from the soot. In one embodiment, the additive reaction product can be added to lubricating compositions in an amount sufficient to reduce the amount of oil thickening of the lubricating oil due to soot content, especially in exhaust gas recirculation (EGR) equipped diesel engines. The additive reaction products of the present disclosure can effectively extend the service time available between oil drains in a vehicle having an engine lubricated with a lubrication composition containing the additive reaction products, among other benefits and advantages. The disclosure is also directed to engines and transmissions lubricated with these improved lubricating compositions and compounds.

DETAILED DESCRIPTION OF CERTAIN EMBODIMENTS

Figure 1:
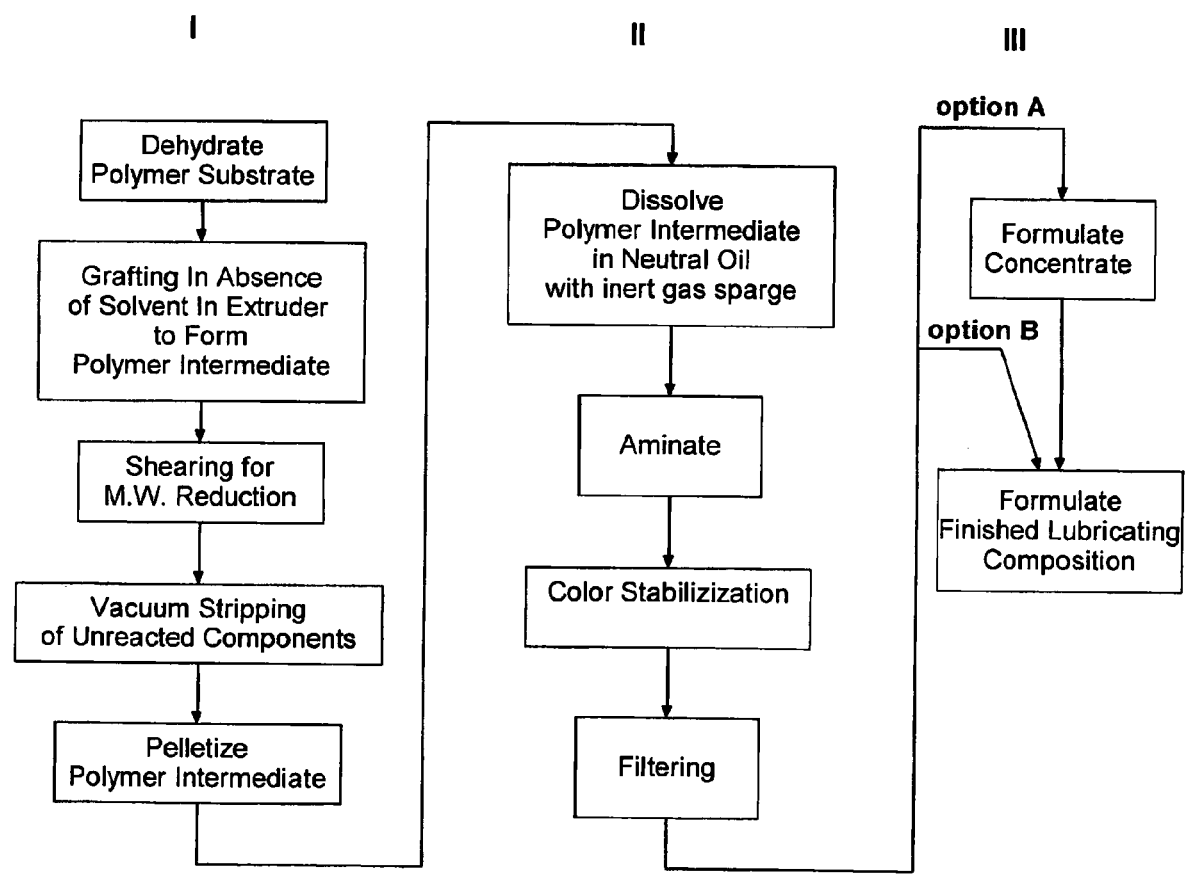
FIG. 1 shows a general process flow chart for making the unique VI modifier additives and lubrication compositions containing them according to embodiments of the present disclosure.

Referring to FIG. 1, in one embodiment a novel highly grafted, multi-functional olefin copolymer is provided as the reaction product of a method comprising solvent-free grafting a previously dehydrated copolymer substrate comprising a polymer of ethylene and one or more $C_3$ to $C_{23}$ alpha-olefins with an acylating agent to provide a copolymer intermediate comprising an acylated olefin copolymer; reducing the molecular weight of the copolymer intermediate by mechanical, thermal, or chemical means, or combinations thereof; vacuum stripping of unreacted components; pelletization of the copolymer intermediate; dissolution of the pelletized copolymer intermediate in solvent neutral oil preferably with inert gas sparging; amination; and optional color stabilization and product filtering. As also indicated in FIG. 1, the highly grafted, multi-functional olefin copolymer product then can be diluted in an oil of lubricating viscosity to provide a lubricant. It may be beneficially used directly, or alternatively as pre-diluted in base oil in concentrate form, as an additive for lubricants. It may be used in lubrication compositions for one or more functions including as a viscosity index (VI) modifier, dispersant, film formation improver, deposit controller, as well as other functions.

I. Preparation of Pelletized Polymer Intermediate Polymer Substrate Starting Material The polymer substrate starting material for use in one embodiment of the present disclosure preferably comprises copolymers of ethylene and one or more $C_3$ to $C_{23}$ alpha-olefins. Copolymers of ethylene and propylene are most preferred. "Copolymers" herein can include without limitation blends or reacted products of ethylene and one or more $C_3$ to $C_{23}$ alpha-olefins, and additionally optionally other dienes or polyenes. Thus, "copolymers" herein also includes terpolymers, and other higher forms. Other alpha-olefins suitable in place of propylene to form the copolymer or to be used in combination with ethylene and propylene to form a terpolymer include 1-butene, 1-pentene, 1-hexene, 1-octene and styrene; α,ω-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

Methods for making the polymer substrate are also described, e.g., in U.S. Pat. Nos. 4,863,623, 5,075,383, and 6,107,257, which descriptions are incorporated herein by reference. The polymer substrate also may be commercially obtained having the properties indicated herein.

More complex polymer substrates, often designated as interpolymers, also may be used as the olefin polymer starting material, which may be prepared using a third component. The third component generally used to prepare an interpolymer substrate is a polyene monomer selected from nonconjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred nonconjugated diene for preparing a terpolymer or interpolymer substrate is 1,4-hexadiene.

The triene component will have at least two nonconjugated double bonds, and up to about 30 carbon atoms in the chain. Typical trienes useful in preparing the interpolymer of the disclosure are 1-isopropylidene-3α,4,7,7α-tetrahydroindene, 1-isopropylidenedicyclopentadiene, dihydro-isodicyclopentadiene, and 2-(2-methylene-4methyl-3-pentenyl)[2.2.1]bicyclo-5-heptene.

Ethylene-propylene or higher alpha-olefin copolymers may consist of from about 15 to 80 mole percent ethylene and from about 85 to 20 mole percent $C_3$ to $C_{23}$ alpha-olefin with the mole ratios in one embodiment being from about 35 to 75 mole percent ethylene and from about 65 to 25 mole percent of a $C_3$ to $C_{23}$ alpha-olefin, with the proportions in another embodiment being from 50 to 70 mole percent ethylene and 50 to 30 mole percent $C_3$ to $C_{23}$ alpha-olefin, and the proportions in yet another embodiment being from 55 to 65 mole percent ethylene and 45 to 35 mole percent $C_3$ to $C_{23}$ alpha-olefin.

Terpolymer variations of the foregoing polymers may contain from about 0 to 10 mole percent of a nonconjugated diene or triene. Other termonomer levels are less than 1 mole percent.

The starting polymer substrate, that is the ethylene copolymer or terpolymer, is an oil-soluble, linear or branched polymer having a number average molecular weight from about 1,000 to 500,000, and for example a number average molecular weight of 50,000 to 250,000, as determined by gel permeation chromatography and universal calibration standardization.

The term "polymer" is used generically to encompass ethylene copolymers, terpolymers or interpolymers. These materials may contain amounts of other olefinic monomers so long as the basic characteristics of the polymers are not materially changed.

The polymerization reaction used to form an ethylene olefin copolymer substrate can generally be carried out in the presence of a conventional Ziegler-Natta or metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred.

Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

The polymer substrate, i.e., the olefin polymer component, generally can be conveniently obtained in the form of ground or pelletized polymer. The olefin polymer can also be supplied as either a pre-mixed bale or a pre-mixed friable chopped agglomerate form.

Dehydration of Polymer Substrate

In one embodiment, ground polymer bales or other forms of the olefin copolymer are fed to an extruder, e.g., a single or twin screw extruder, or a Banbury or other mixer having the capability of heating and effecting the desired level of mechanical work (agitation) on the polymer substrate for the dehydration step. A nitrogen blanket can be maintained at the feed section of the extruder to minimize the introduction of air.

The olefin copolymer is initially heated before being admixed with any other reactants in the extruder or other mixer with venting to eliminate moisture content in the feed material. The dried olefin copolymer is in one embodiment then fed into another extruder section or separate extruder in series for conducting the grafting reaction.

Grafting Procedure:

Acylating Agents—Graft Monomers

A graft monomer is next grafted onto the polymer backbone of the polymer substrate to form an acylated ethylene-alphaolefin polymer.

Suitable graft monomers include ethylenically unsaturated carboxylic acid materials, such as unsaturated dicarboxylic acid anhydrides and their corresponding acids. Examples of these graft monomers are set forth, for example, in U.S. Pat. No. 5,837,773, which descriptions are incorporated herein by reference. These carboxylic reactants which are suitable for grafting onto the ethylene-alphaolefin interpolymers contain at least one ethylenic bond and at least one carboxylic acid or its anhydride groups or a polar group which is convertible into said carboxyl groups by oxidation or hydrolysis. The carboxylic reactants are selected from the group consisting of acrylic, methacrylic, cinnamic, crotonic, maleic, fumaric and itaconic reactants or a mixture of two or more of these. In the case of unsaturated ethylene copolymers or terpolymers, itaconic acid or its anhydride is useful due to its reduced tendency to form a cross-linked structure during the free-radical grafting process.

The ethylenically unsaturated carboxylic acid materials typically can provide one or two carboxylic groups per mole of reactant to the grafted copolymer. That is, methyl methacrylate can provide one carboxylic group per molecule to the grafted copolymer while maleic anhydride can provide two carboxylic groups per molecule to the grafted copolymer.

Free-Radical Initiator

The grafting reaction to form the acylated olefin copolymers is in one embodiment generally carried out with the aid of a free-radical initiator either in bulk or in solution. The grafting can be carried out in the presence of a free-radical initiator dissolved in oil. The use of a free-radical initiator dissolved in oil results in a more homogeneous distribution of acylated groups over the olefin copolymer molecules.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2,5-bis-tertiary-butyl peroxide. The initiator is used in an amount of between about 0.005% and about 1% by weight based on the weight of the reaction mixture.

Grafting Reaction Equipment and Conditions

To perform the grafting reaction as a solvent-free or essentially solvent-free bulk process, the graft monomer and olefin copolymer are in one embodiment fed to an extruder, e.g., a single or twin screw extruder e.g. Werner & Pfleiderer's ZSK series, or a Banbury or other mixer, having the capability of heating and effecting the desired level of mechanical work (agitation) on the reactants for the grafting step. In one embodiment, grafting is conducted in an extruder, and particularly a twin screw extruder. A nitrogen blanket is maintained at the feed section of the extruder to minimize the introduction of air.

In one embodiment, one can conduct grafting in an extruder, such as a twin-screw extruder. A nitrogen blanket is maintained at the feed section of the extruder to minimize the introduction of air. In another embodiment, the olefinic carboxylic acylating agent can be injected at one injection point, or is alternatively injected at two injection points in a zone of the extruder without significant mixing e.g. a transport zone. This results in an improved efficiency of the grafting and leads to a lower gel content.

Suitable extruders are generally known available for conducting grafting, and the prior dehydration procedure. The dehydration of the polymer substrate and subsequent grafting procedures can be performed in separate extruders set up in series. Alternatively, a single extruder having multiple treatment or reaction zones can be used to sequentially conduct the separate operations within one piece of equipment. Illustrations of suitable extruders are set forth, e.g., in U.S. Pat. No. 3,862,265 and U.S. Pat. No. 5,837,773, which descriptions are incorporated herein by reference.

In forming the acylated olefin copolymers, the olefin copolymer generally is fed to plastic processing equipment such as an extruder, intensive mixer or masticator, heated to a temperature of at least 60°, for example, 150° to 240° C., and the ethylenically unsaturated carboxylic acid reagent and free-radical initiator are separately co-fed to the molten copolymer to effect grafting. The reaction is carried out optionally with mixing conditions to effect grafting of the olefin copolymers. If molecular weight reduction and grafting can be performed simultaneously, illustrative mixing conditions are described in U.S. Pat. No. 5,075,383, which are incorporated herein by reference. The processing equipment is generally purged with nitrogen to prevent oxidation of the copolymer and to aid in venting unreacted reagents and byproducts of the grafting reaction. The residence time in the processing equipment is controlled to provide for the desired degree of acylation and to allow for purification of the acylated copolymer via venting. Mineral or synthetic lubricating oil may optionally be added to the processing equipment after the venting stage to dissolve the acylated copolymer.

The grafting reaction can be carried out in solvent-free or essentially solvent free environment. The grafting reaction preferably is performed in the absence of hydrocarbon solvents. The avoidance of hydrocarbon solvents during the grafting reaction, such as alkanes (e.g., hexane), eliminates or significantly reduces the risk and problem of undesired side reactions of such solvents during the grafting reaction which can form undesired grafted alkyl succinic anhydride by-products and impurities. Also, reduced amounts of transient unfunctionalized polymer (ungrafted polymer) are present after grafting in solventless grafting reactions, which results in a more active product. Therefore, the resulting copolymer intermediate is a more active product. A reduction is achieved in levels of undesirable grafted solvent (i.e., grafted hexyl succinic anhydride) and transient unfunctionalized (nongrafted) copolymer.

Hydrocarbon solvents can be omitted according to certain embodiments of the present disclosure include solvents that generally are more volatile than the reactants of the grafting reaction described herein, for example, solvents having a boiling point less than about 150° C. under standard atmospheric pressure conditions (i.e., approximately 14.7 lb./in$^2$ absolute). The solvents that can be omitted include, for example, open-chain aliphatic compounds such as $C_9$ or lower alkanes, alkenes and alkynes (e.g., $C_5$ to $C_8$ alkanes such as hexane); aromatic hydrocarbons (e.g., compounds having a benzene nucleus such as benzene and toluene); alicyclic hydrocarbons such as saturated cyclic hydrocarbons (e.g., cyclohexane); ketones; or any combinations of these. In one embodiment, it is desirable to omit all solvents having boiling points approximating or lower than that of nonane under standard atmospheric conditions. Some conventional grafting reactions have been performed in the presence of considerable amounts of hydrocarbon solvent, such as approximately 15% to 60% hexane content. By comparison, in one embodiment of the present disclosure, the total amount of these types of such solvents in the grafting reaction mass does not exceed 0.5 wt. % content thereof.

The grafted copolymer intermediate exits from the die face of the extruder either immediately after grafting, or after shearing and vacuum stripping (discussed below in more detail) if performed in different sections of the same extruder or a separate extruder arranged in series with the extruder in which grafting is conducted.

Selected Properties of Copolymer Intermediate

The resulting copolymer intermediate comprises an acylated olefin copolymer characterized by having carboxylic acid acylating functionality randomly within its structure. The amount of carboxylic acid acylating agent (e.g., maleic anhydride) that is grafted onto the prescribed copolymer backbone (i.e., the copolymer substrate) is important. This parameter is referred to herein as the degree of grafting (DOG), further described as the mass percentage of acylating agent on the acylated copolymer. The DOG generally is in the range of 0.5 to 3.0 wt. %, particularly in the range of 1.5 to 2.5 wt. %, and more particularly in the range of 1.7 to 2.3 wt. %, of carboxylic acid acylating agent grafted on the copolymer backbone.

The DOG value of a particular additive reaction product can be determined either by infrared peak ratio analysis of acid or anhydride moiety versus copolymer alkyl functionality or by titration (Total Acid/Anhydride Number) (TAN) of the additive reaction product. The TAN value in turn can be used to estimate the degree of grafting (DOG).

The carboxylic reactant is grafted onto the prescribed copolymer backbone to provide 0.15 to 0.75 carboxylic groups per 1000 number average molecular weight units (Mn) of the copolymer backbone, preferably 0.2 to 0.5 carboxylic groups per 1000 number average molecular weight. For example, a copolymer substrate with Mn of 20,000 is grafted with 3 to 15 carboxylic groups per copolymer chain or 1.5 to 7.5 moles of maleic anhydride per mole of copolymer. A copolymer with Mn of 100,000 is grafted with 15 to 75 carboxylic groups per copolymer chain or 7.5 to 37.5 moles of maleic anhydride per copolymer chain. The minimum level of functionality is the level needed to achieve the minimum satisfactory dispersancy performance.

Molecular Weight Reduction of Copolymer Intermediate

The molecular weight of the acylated olefin copolymer, i.e., the copolymer intermediate, is reduced by mechanical, thermal, or chemical means, or a combination thereof. Techniques for degrading or reducing the molecular weight of such copolymers are generally known in the art. The number average molecular weight is reduced to suitable level for use in single grade or multigrade lubricating oils.

In one embodiment, the initial copolymer intermediate has an initial number average molecular weight ranging from about 1,000 to about 500,000 upon completion of the grafting reaction. In one embodiment, to prepare an additive intended for use in multigrade oils, the copolymer intermediate's number average molecular weight is reduced down to a range of about 1,000 to about 80,000.

Alternatively, grafting and reduction of the high molecular weight olefin copolymer may be done simultaneously. In another alternative, the high molecular weight olefin copolymer may be first reduced to the prescribed molecular weight before grafting. When the olefin copolymer's average molecular weight is reduced before grafting, its number average molecular weight is sufficiently reduced to a value below about 80,000, e.g., in the range of about 1,000 to 80,000.

Reduction of the molecular weight of the copolymer intermediate, or the olefin copolymer feed material during or prior to grafting, to a prescribed lower molecular weight typically is conducted in the absence of a solvent or in the presence of a base oil, using either mechanical, thermal, or chemical means, or combination of these means. Generally, the copolymer intermediate, or olefin copolymer, is heated to a molten condition at a temperature in the range of about 250° C. to about 350° C. and it is then subjected to mechanical shear, thermally or chemical induced cleavage or combination of said means, until the copolymer intermediate (or olefin copolymer) is reduced to the prescribed molecular weight. The shearing may be effected within an extruder section, such as described, e.g., in U.S. Pat. No. 5,837,773, which descriptions are incorporated herein by reference. Alternatively, mechanical shearing may be conducted by forcing the molten copolymer intermediate (or olefin copolymer) through fine orifices under pressure or by other mechanical means.

Vacuum Stripping of Unreacted Ingredients

Upon completion of the grafting reaction, unreacted carboxylic reactant and free radical initiator usually are removed and separated from the copolymer intermediate before further functionalization is performed on the copolymer intermediate. The unreacted components may be eliminated from the reaction mass by vacuum stripping, e.g., the reaction mass may be heated to temperature of about 150° C. to about 450° C. under agitation with a vacuum applied for a period sufficient to remove the volatile unreacted graft monomer and free radical initiator ingredients. Vacuum stripping preferably is performed in an extruder section equipped with venting means.

Pelletization of Copolymer Intermediate

The copolymer intermediate is pelletized before further processing in accordance with embodiments of the disclosure herein. Pelletization of the copolymer intermediate helps to isolate the intermediate product and reduce contamination thereof until further processing is conducted thereon at a desired time.

The copolymer intermediate can generally be formed into pellets by a variety of process methods commonly practiced in the art of plastics processing. These include underwater pelletization, ribbon or strand pelletization or conveyor belt cooling. When the strength of the copolymer is inadequate to form into strands, the preferred method is underwater pelletization. Temperatures during pelletization should not exceed 30° C. Optionally, a surfactant can be added to the cooling water during pelletization to prevent pellet agglomeration.

The mixture of water and quenched copolymer pellets is conveyed to a dryer such as a centrifugal drier for removal of water. Pellets can be collected in a box or plastic bag at any volume for storage and shipment. Under some conditions of storage and/or shipment at ambient conditions, pellets may tend to agglomerate and stick together. These can be readily ground by mechanical methods to provide high surface area solid pieces for easy and quick dissolution into oil.

II. Functionalization of Pelletized Copolymer Intermediate

Dissolution of Pelletized Copolymer Intermediate

The pelletized copolymer intermediate may be supplied as an unground or ground form of the pellets. The pelletized acylated copolymer intermediate is dissolved in solvent neutral oil. The pellets generally are dissolved in the solvent at an introduction level of from about 5 wt. % to about 25 wt. %, particularly about 10 wt. % to about 15 wt. %, and more particularly about 12 wt. % to about 13 wt. %, based on the resulting solution (solute and solvent) viscosity.

The pelletized copolymer intermediate can be dissolved in the solvent neutral at temperature of, for example, about 135° C. to about 165° C. with mechanical stirring under a nitrogen blanket. The dissolving mixture is sparged with inert gas during the dissolution for about 4 to 16 hours. This treatment can performed in a continuous stirred process vessel of suitable capacity.

The inert sparging gas can be nitrogen. The dissolution and sparging, if used, can be prior to the subsequent amination procedure. One or more spargers are located within the vessel at locations submerged beneath the surface of the solution, preferably near the bottom of the solution, and bubble inert gas through the solution. Nitrogen sparging removes moisture from the dissolved copolymer intermediate and solvent oil. Importantly, the removal of moisture from the copolymer intermediate acts to convert any polymeric dicarboxylic diacids present back to the desired copolymeric dicarboxylic anhydride form.

For instance, where maleic anhydride is used as the grafting monomer, some portion of the pelletized copolymer intermediate may inadvertently transform to a copolymeric succinic diacid form. In general, this change is more apt to occur as a function of a longer shelf life. The conducting of nitrogen sparging during dissolution of the copolymer intermediate and prior to amination has the benefit of converting the copolymeric succinic diacid back into the desired active polymeric succinic anhydride form before the copolymer intermediate is further reacted and functionalized (e.g., aminated). Consequently, a more highly functionalized and active aminated product can be obtained in subsequent processing. The conversion of polymeric succinic diacid present back into the active polymeric succinic anhydride form can be monitored by measuring the viscosity of the solution. The solution viscosity decreases significantly from an initial higher value down to a steady-state value upon conversion of all or essentially all of the polymeric succinic diacid back into the desired polymeric succinic anhydride form.

The neutral oil may be selected from Group I base stock, Group II base stock, Group III base stock, Group IV or poly-alpha-olefins (PAO), or base oil blends thereof.

The base stock or base stock blend preferably has a saturate content of at least 65%, more preferably at least 75%; a sulfur content of less than 1%, preferably less than 0.6%, by weight; and a viscosity index of at least 85, preferably at least 100. These base stocks can be defined as follows:

Group I: base stocks containing less than 90% saturates and/or greater than 0.03% sulfur and having a viscosity index greater than or equal to 80 and less than 120 using test methods specified in Table 1 of the American Petroleum Institute (API) publication "Engine Oil Licensing and Certification Sheet" Industry Services Department, 14$^{th}$ Ed., December 1996, Addendum I, December 1998;

Group II: base stocks containing greater than or equal to 90% saturates and/or greater than 0.03% sulfur and having a viscosity index greater than or equal to 80 and less than 120 using test methods specified in Table 1 referenced above;

Group III: base stocks which are less than or equal to 0.03 wgt % sulfur, greater than or equal to 90% saturates, and greater than or equal to 120 using test methods specified in Table 1 referenced above.

Group IV: base stocks which comprise PAO's.

For these definitions, saturates level can be determined by ASTM D 2007, the viscosity index can be determined by ASTM D 2270; and sulfur content by any one of ASTM D 2622, ASTM D 4294, ASTM D 4927, or ASTM D 3120.

Amination of Dissolved Copolymer Intermediate

The dissolved pelletized copolymer intermediate possessing carboxylic acid acylating functions is reacted with an amine compound. The amine may be selected from compounds such as described, e.g., in U.S. Pat. Nos. 4,863,623, 5,075,383, and 6,107,257, which descriptions are incorporated herein by reference. In one embodiment, the amine compound may be selected from the group consisting of:

(a) an N-arylphenylenediamine represented by the formula:

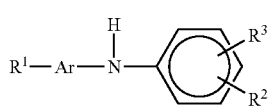

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$—)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

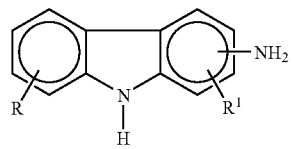

in which R and $R^1$ represent hydrogen or an alkyl, alkenyl, or alkoxyl radical having from 1 to 14 carbon atoms, (c) an aminoindole represented by the formula:

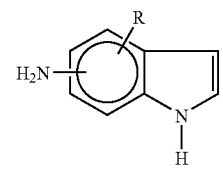

in which R represents hydrogen or an alkyl radical having from 1 to 14 carbon atoms, (d) an amino-indazolinone represented by the formula:

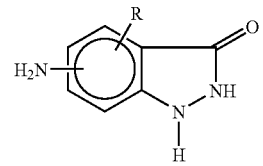

in which R is hydrogen or an alkyl radical having from 1 to 14 carbon atoms, (e) an aminomercaptotriazole represented by the formula:

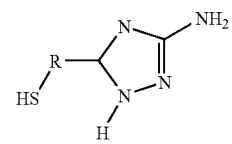

in which R can be absent or can be $C_1$-$C_{10}$ linear or branched hydrocarbon selected from the group consisting of alkyl, aryl, alkaryl, or arylalkyl.

(f) an aminopyrimidine represented by the formula:

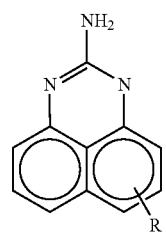

in which R represents hydrogen or an alkyl or alkoxyl radical having from 1 to 14 carbon atoms.

In one embodiment, the amine compound may be, e.g., an N-arylphenylenediamine represented by the general formula:

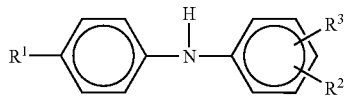

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —$NH_2$, $CH_2$—$(CH_2)_n$—$NH_2$, $CH_2$-aryl-$NH_2$, in which n has a value from 1 to 10 and $R^3$ is hydrogen, alkyl, alkenyl, alkoxyl, aralkyl, alkaryl having from 4 to 24 carbon atoms.

Particularly useful amines in the present disclosure are the N-arylphenylenediamines, more specifically the N-phenylphenylenediamines, for example, N-phenyl-1,4-phenylenediamine, N-phenyl-1,3-phenylendiamine, and N-phenyl-1,2-phenylenediamine.

Illustrations of other useful amines include those described in U.S. Pat. Nos. 4,863,623 and 6,107,257, which are incorporated herein by reference.

It is preferred that the amines contain only one primary amine group so as to avoid coupling and/or gelling of the olefin copolymers.

The reaction between the copolymer substrate intermediate having grafted thereon carboxylic acid acylating function and the prescribed amine compound is preferably conducted by heating a solution of the copolymer substrate under inert conditions and then adding the amine compound to the heated solution generally with mixing to effect the reaction. It is convenient to employ an oil solution of the copolymer substrate heated to 120° to 175°, while maintaining the solution under a nitrogen blanket. The amine compound is added to this solution and the reaction is effected under the noted conditions.

The amine compound can be dissolved with a surfactant and added to a mineral or synthetic lubricating oil or solvent solution containing the acylated olefin copolymer. This solution is heated with agitation under an inert gas purge at a temperature in the range of 120° to 200° C. as described in U.S. Pat. No. 5,384,371, the disclosure of which is herein incorporated by reference. The reactions are carried out conveniently in a stirred reactor under nitrogen purge.

In one aspect, a polymeric succinic anhydride oil solution is reacted with N-phenyl-1,4-phenylenediamines, along with ethoxylated lauryl alcohol in a reactor carried out at 165° C.

Surfactants which may be used in carrying out the reaction of the acylated olefin copolymer with the polyamine(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the polyamine(s).

A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® L-24-2, NB40, N-60, L-24-5, L-46-7 (Huntsman Chemical Company), NEODOL® 23-5 and 25-7 (Shell Chemical Company) and TERGITOL® surfactants (Union Carbide). Useful surfactants can include those surfactants that contain a functional group, e.g., —OH, capable of reacting with the acylated olefin copolymer. Ethoxylated lauryl alcohol ($C_{12}H_{25}(OCH_2CH_2)_n OH$) is also useful herein. Ethoxylated lauryl alcohol is identified under CAS no. 9002-92-0. The ethoxylated lauryl alcohol is a processing aid and viscosity stabilizer for the final multifunctional viscosity modifier product. The ethoxylated lauryl alcohol facilitates the amine charge into the reaction mixture. It is a reaction agent ensuring that no acylated functionality is left unreacted. Any unreacted acylated functionality causes undesirable viscosity drift in finished lubrication formulations. The surfactant also modifies the viscoelastic response in the multifunctional viscosity modifier product allowing improved handling at low temperature (70 to 90° C.).

The quantity of surfactant used depends in part on its ability to solubilize the amine. Typically, concentrations of 5 to 40 wt. % amine are employed. The surfactant can also be added separately, instead of or in addition to the concentrates discussed above, such that the total amount of surfactant in the finished additive is 10 wt. % or less.

The highly grafted, multi-functional olefin copolymers of the present disclosure can be incorporated into lubricating oil in any convenient way. Thus, the highly grafted, multi-functional olefin copolymers can be added directly to the lubricating oil by dispersing or dissolving the same in the lubricating oil at the desired level of concentration. Such blending into the lubricating oil can occur at room temperature or elevated temperatures. Alternatively, the highly grafted, multi-functional olefin copolymers can be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 45 wt. %, and preferably from about 10 to about 35 wt. %, highly grafted, multi-functional olefin copolymer additive, and typically from about 20 to 90 wt %, preferably from about 40 to 60 wt %, base oil based on the concentrate weight.

Color Stabilization

Several of the amine reactants have the tendency to form highly colored oxidation products, comprising members of the class of staining amine antioxidants. Unreacted amine which is left in the oil solution after the amination reaction can give rise to undesirable and/or unstable color in the oil solution. The acylated olefin copolymer also may be color stabilized after the amination reaction, such as by reacting the acylated olefin copolymer with a $C_7$ to $C_{12}$ alkyl aldehyde (e.g., nonyl aldehyde). For example, the reaction may proceed when the alkyl aldehyde agent is added in an amount of about 0.2 to about 0.6 wt. % under similar temperature and pressure conditions as used in the amination reaction for about 2 to about 6 hours.

Filtering

To increase the purity of the aminated, color stabilized acylated olefin copolymer product, it may be filtered by either bag or cartridge filtration or both in series.

Additive Reaction Product

As indicated above, the copolymer intermediate can in one embodiment be prepared in the absence of solvent. Also, the copolymer intermediate can be received in pelletized or bale form as a starting material for performing the additional functionalization(s), viz. amination and color stabilization, on the grafted copolymer intermediate. The copolymer intermediate need not be received directly from the die face of an extruder or similar grafting reaction vessel, but instead the copolymer intermediate has been vacuum stripped of unreacted reactants and pelletized before these further functionalizations are performed on it. Therefore, the pelletized copolymer intermediate contains less contaminants than a product that has been grafted in the presence of a solvent (which can lead to side reaction products) and/or aminated immediately after the grafting reaction as part of a continuous process flow arrangement (which leaves unreacted components as impurities in the reaction mass).

In addition, the use of inert gas sparging on the copolymer intermediate dissolved in neutral oil prior to amination has the benefit of converting polymeric succinic diacid present back into the desired active polymeric succinic anhydride form before the copolymer intermediate is further reacted and functionalized (e.g, aminated).

Also, since unreacted graft monomer, e.g., maleic anhydride is effectively removed after the grafting step during vacuum stripping that precedes pelletizing and dissolution, amination proceeds more efficiently. That is, the presence of unreacted graft monomers are undesirable during the amination step as they may compete with the grafted copolymer (polymer intermediate) in reactions with the amine, reducing the level of functionalization achieved.

Therefore, the multi-functional reaction end product of embodiments of the present disclosure contains fewer impurities (i.e., unreacted reactants, side reaction products and by-products) and is more active for a given amount thereof. In one embodiment, the additive reaction product contains less than 0.1 wt. % total impurities comprising unreacted reactants, side reaction products and reaction by-products. The remainder is composed of active grafted, multifunctionalized olefin copolymer either entirely, or substantially in combination with some minor amount of beneficial or inert additive introduced during processing, such as an antioxidant or colorant, which does not significantly reduce or impair the activity of the product compound.

The highly grafted, multi-functional olefin copolymer product compounds of the present disclosure optionally may be post-treated so as to impart additional properties necessary or desired for a specific lubricant application. Post-treatment techniques are well known in the art and include boronation, phosphorylation, glycolation, ethylene-carbonation, and maleination.

III. Lubricating Compositions

The highly grafted, multi-functional olefin copolymer products of the present disclosure may be beneficially used directly, or alternatively as pre-diluted in base oil in concentrate form, as unique additives for lubricants. The highly grafted, multi-functional olefin copolymer products of the present disclosure find their primary utility in lubricating oil compositions which employ a base oil in which the additives are dissolved or dispersed in amount sufficient to provide the desired functionality. Such base oils may be natural, synthetic or mixtures thereof. Base oils suitable for use in preparing the lubricating oil compositions of the present disclosure include those conventionally employed as crankcase lubricating oils for spark-ignited and compression-ignited internal combustion engines, such as automobile and truck engines, marine and railroad diesel engines, and the like. The internal combustion engines which can be advantageously lubricated with crankcase lubricating oils containing the unique VI improver additives set forth herein include gasoline, gasohol, and diesel fuel powered engines. The diesel engines that can be beneficially lubricated include heavy duty diesel engines, including those equipped with exhaust gas recirculation (EGR) systems.

Among other advantages, these additives have been observed in performance tests, such as described in the examples below, to provide improved soot dispersing, deposit control and film formation properties in comparison to standard VI improver additives. Improved control of soot aggregation and wear protection can be achieved by using oils containing the unique additives of the present disclosure in lubricating oils used to lubricate internal combustion engines, particularly EGR-equipped heavy duty diesel engines (especially cooled EGR engines).

The cooled lubricated EGR engines within the scope of the present disclosure include automotive engines, heavy and light duty diesel and gasoline truck engines, gasoline combustion engines, diesel engines, hybrid internal combustion/electric engines. These can include EGR engines cooled by the circulation or heat exchange of water, water/hydrocarbon blends or mixtures, water/glycol mixtures, and/or air or gas.

In one embodiment, lubricating oil compositions of the present disclosure achieve a weighted demerits-1P (WDP) value of less than 250, a top land carbon (TLC) value of less than 20, and a top groove carbon (TGC) value of less than 20, in the Caterpillar 1P Test Method. These results show the improved deposit control, particularly in comparison to engine oils containing current commercial VI modifier dispersants such as HiTEC® H5777 (Afton Chemical).

The lubricating oil compositions of the present disclosure also have improved boundary film formation properties. For example, the lubricating oil compositions of the disclosure form boundary films having a percent film value of about 80 to about 95 in a High Frequency Reciprocating Rig (HFRR) test conducted at a 3% soot (carbon black) level (see FIG. 2), wherein the percent film is determined according to a method described in U.S. Pat. No. 6,767,971. At a 6% soot (carbon black) level, the lubricating oil compositions form a boundary film having percent film value of about 50 to about 70 in a HFRR test with the percent film determined in a similar manner. The boundary film formation properties of lubricants containing the additive reaction product of the present disclosure have been experimentally measured to be superior to those of commercial VI modifier dispersants such as HiTEC® H5777, at both the 3% and 6% soot levels (see FIG. 2). The inventive lubricating compositions have larger percent film values in HFRR tests than lubricants modified with HiTEC® H5777 at both soot levels. As generally understood, larger film value measurements by HFRR indicates thicker boundary film formation, and vice versa with respect to smaller film values. It has been shown in prior studies published in this field that the ability of lubricating fluids to form boundary films in the presence of contaminants can help these fluids prevent engine wear. Prior published studies have also indicated that thicker boundary films should provide better wear protection than thinner boundary films such as in a soot-containing lubrication environment, all other things equal. E.g., see Devlin, Mark T. et al., Film Formation Properties of Polymers in the Presence of Abrasive Contaminants," SAE 2002-01-2793, 2002, Society of Automotive Engineers, Inc., 9 pages total, which descriptions are incorporated herein for all purposes.

The lubricating oil compositions of the present disclosure also have greater thickening efficiency, as measured by kinematic viscosity measurements at 100° C. (KV100) as compared to commercial VI modifier dispersants such as HiTEC® H5777. For instance, in one embodiment, the lubricating oil composition of the present disclosure may have a kinematic viscosity at 100° C. (KV100) in the range of 9.3 to 21.8 cSt. In another embodiment it has a KV100 value in the range of 9.3 to 16.3 cSt. In yet another embodiment it has a KV100 value in the range of 15 to 16.3 cSt.

The lubricating oil compositions of the present disclosure also achieve a viscosity increase of less than 10 cSt, and particularly less than 8 cSt, at 100° C. at a soot level of up to 6.0% in the Mack T-11 test.

Advantageous results are also achieved by employing the additive mixtures of the present disclosure in base oils conventionally employed in and/or adapted for use as power transmitting fluids, heavy duty hydraulic fluids, power steering fluids and the like. Gear lubricants, industrial oils, pump oils and other lubricating oil compositions can also benefit from the incorporation therein of the additive mixtures of the present disclosure.

These lubricating oil formulations conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoaming agents, demulsifiers and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the highly grafted, multi-functional olefin copolymer would usually be employed in the form of a 10 to 50 wt. % concentrate, for example, in a lubricating oil fraction. In one embodiment, the amount of the dispersant viscosity improver in a finished lubricating oil is from about 0.5 weight percent to about 18 weight percent, and particularly about 1 weight percent to about 2.5 weight percent.

The highly grafted, multi-functional olefin copolymers of the present disclosure will generally be used in admixture with a lube oil base stock, comprising an oil of lubricating viscosity, including natural lubricating oils, synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this disclosure include one of any number of commonly used synthetic hydrocarbon oils, which include, but are not limited to, poly-alpha-olefins, alkylated aromatics, alkylene oxide polymers, copolymers, terpolymer, interpolymers and derivatives thereof here the terminal hydroxyl groups have been modified by esterification, etherification, etc, esters of dicarboxylic acids, and silicon-based oils.

The present disclosure is further directed to a method of extending lubricant drain intervals in a vehicle is contemplated. Said method comprises adding to and operating in the crankcase of the vehicle the lubricating oil composition described above.

The lubricating compositions of the present disclosure may also improve fuel economy and fuel economy durability of a vehicle. They also may offer improved temperature properties.

The following examples illustrate the preparation and use of the highly grafted, multi-functional olefin copolymers of the present disclosure. All amounts, percentages, parts, and ratios are by weight unless indicated otherwise.

EXAMPLES

Example I

Preparation of Highly Grafted (DOG=1.9), Multi-Functional Viscosity Modifier: Copolymer Intermediate)

A pelletized acylated olefin copolymer was initially prepared in the following manner. An ethylene-propylene copolymer (EPM) with an ethylene content of 59 mol % (49 wt %) and a molecular weight number (Mn between 150,000 and 200,000) was fed into a multi-zone co-rotating twin screw extruder. The olefin copolymer was dehydrated initially in a first zone of the extruder at a temperature of about 200 to 400° C., residence time less than 5 minutes. An acylated ethylene-propylene copolymer was prepared by free radically grafting maleic anhydride, in the absence of solvent, onto an ethylene-propylene copolymer backbone in the extruder by introducing maleic anhydride and a peroxide free-radical initiator in amounts, and at a suitable temperature and time period to provide an acylated ethylene-propylene copolymer having a DOG of 1.9. The acylated ethylene-propylene copolymer had a number average molecular weight of approximately 30,000 to 60,000 as determined by gel permeation chromatography. The reaction conditions and molar proportions of maleic anhydride and ethylene-propylene copolymer were such that 13 molecules of maleic anhydride were grafted onto the olefin copolymer backbone. This is equivalent to 0.4 carboxylic groups per 1000 Mn of polymer to form the acylated ethylene-propylene copolymer. Unreacted maleic anhydride and peroxide decomposition products were removed with vacuum stripping. The reaction mass was heated from 300° C. to 400° C. A vacuum of greater than 28 inches Hg (less than 1.9 inches Hg absolute) was applied. The polymer intermediate is quenched and pelletized. A slurry of pellets and water is conveyed to a centrifuge to separate the pellets from the water. The pellets are dried in a fluidized dryer. The pelletized intermediate product is packaged in 25 kg bags, and stored for approximately 30 days.

1830 kg of the pelletized intermediate product was mixed with 12,248 kg Group I solvent neutral oil at a temperature of 135° C. with mechanical stirring while the mixture was maintained under a nitrogen blanket. Whilst the copolymer was dissolving, the solution was sparged with nitrogen gas at a rate about a couple cubic feet/min. and mixing was continued under the nitrogen blanket for an additional 4 hours at ramp the temperature to 165° C. 14080 kg of the resulting oil solution of the copolymer was then reacted with 87 kg n-phenyl-p-phenylene (NPPDA) and 470 kg ethoxylated lauryl alcohol (SURFONIC® L24-2, Huntsman Chemical Company) in a reaction effected over 42 hours at between 160 to 170° C. under a nitrogen atmosphere and with mechanical stirring. For color stabilization, the reaction mixture containing the aminated product was combined with 59 kg nonyl aldehyde for 4 hours as cooling from 160° C. to 110° C. with agitation under a nitrogen atmosphere. The resulting reaction mixture containing the multifunctionalized graft copolymer reaction product was filtered.

VI Modifier Compound Properties

The multifunctionalized graft copolymer reaction product made in the above-described manner, identified herein as Sample No. 1, and a commercial VI modifier-dispersant (HiTEC® 5777, Afton Corporation) were analyzed and found to have the properties indicated in Table 1 below.

TABLE 1

Analytical Properties of VI Modifiers

| Property | HiTEC ® 5777 | Sample No. 1 |
|---|---|---|
| Polymer Content, wt. % | 12.9 | 12.7 |
| Molecular Wt., Mn | 84217 | 85007 |
| Nitrogen, % | 0.089 | 0.082 |
| DOG | 1.9–2.1 | 1.9 |

As can be seen from the results in Table 1, the inventive additive reaction product has properties comparable to the commercial VI modifier-dispersant.

Engine Performance Tests

Engine performance testing was performed to compare the performance of the inventive VI modifier Sample No. 1 versus the commercial product HiTEC® 5777. Identical Heavy Duty Engine Oil formulations were formulated which differed only as to the particular VI modifier dispersant component. The tested oil formulations contained a VI modifier dispersant olefin copolymer (approximately 2.2%), borated polyisobutylene succinimide capped with maleate (3.3%), glycolated capped succinimide dispersant (1.4%), zinc dialkyldithiophosphate (1%), calcium phenate (1%), neutral $C_{14}$-$C_{24}$ alphaolefin calcium sulfonate (0.48%), overbased $C_{14}$-$C_{24}$ alphaolefin calcium sulfonate (0.11%), diarylamine (0.7%), glycerol monooleate (0.4%), high molecular weight phenol (1.5%) was utilized in a Caterpillar heavy duty engine crankcase. The percentages of each component included in parentheses represent the weight percent of each component in the lubricating oil compositions, based upon the final weight of the lubricating oil composition. The remainder of the lubricating oil composition consisted of Group II base oil. PPD and antifoam were added at minor concentrations (i.e., <0.2%). These lubricating oil compositions had a TBN of 8.3. The percentages of sulfated ash, sulfur, and phosphorous contained in the lubricating oil composition were 0.88%, 0.29%, and 0.107%, respectively. Oil 1 representing the present disclosure was formulated with 2.2 wt. % inventive VI modifier Sample No. 1, while another Comparison Oil A was instead formulated with 2.2 wt. % HiTEC® 5777 as the VI modifier dispersant. Each resulting lubricating composition was then subjected to a Caterpillar 1P engine test. The results are indicated in Table 2 below. Any applicable compliance limits for a parameter are also indicated in Table 2.

TABLE 2

Heavy Duty Engine Test Data

| Test Oil | Comparison Oil A | Oil 1 |
|---|---|---|
| Test VI Modifier | HiTEC ® 5777 | Sample No. 1 |
| Test Base Oil | Group II | Group II |
| Test Additive | PC10 | PC10 |
| Package | Prototype | Prototype |

TABLE 2-continued

Heavy Duty Engine Test Data

| Analytical data | | | Limits |
|---|---|---|---|
| P, ppm | 1069 | 1063 | 1200 max |
| S, ppm | 3060 | 3525 | 4000 max |
| Sulfated Ash, % | 0.88 | 0.93 | 1.00 max |
| TBN, D 2896 | 7.5 | 6.7 | — |
| KV@100° C., cSt | 14.46 | 16.23 | 16.3 max |
| CCS@-20° C., cP | 5198 | 5747 | 7000 max |
| B, ppm | 436 | 423 | — |
| Ca, ppm | 1942 | 1948 | — |
| Zn, ppm | 1200 | 1199 | — |

| CAT 1P Engine Test Results | | | Limits |
|---|---|---|---|
| TLC | 24.5 | 17.8 | 40 max |
| TGC | 30 | 16.8 | 36 max |
| WDP | 318.4 | 239.2 | 350 max |
| Avg. O.C., g/h | 5.4 | 4.1 | 12.4 max |
| Final O.C., g/h | 7.3 | 3.8 | 14.6 max |
| Scuffing | none | none | none |

The above-indicated results of the Caterpillar 1P engine test show that the lubricant containing the inventive Sample No. 1 provided better deposit control than the lubricant containing the commercial modifier. This result is considered surprising and unexpected because the tested VI modifier copolymer compounds were generally equivalent in analytical performance parameters. In comparison for the results observed for the comparative lubricant containing the commercial VI modifier compound, the lubricating containing inventive Sample No. 1 had significantly lower and reduced values in the Caterpillar 1P weighted demerits—1P (WDP), top groove carbon (TGC) and in top land carbon (TLC) deposits, which shows that the inventive Sample No. 1 is superior. The inventive Sample No. 1 also had greater thickening efficiency as compared to that of the comparison commercial additive, as shown by the difference in kinematic viscosity values.

The lubricating oil composition containing Sample No. 1 also achieved a passing viscosity increase value of about 7.3 cSt at 100° C. at a soot level of up to 6.0% in a Mack T-11 test.

Figure 2:
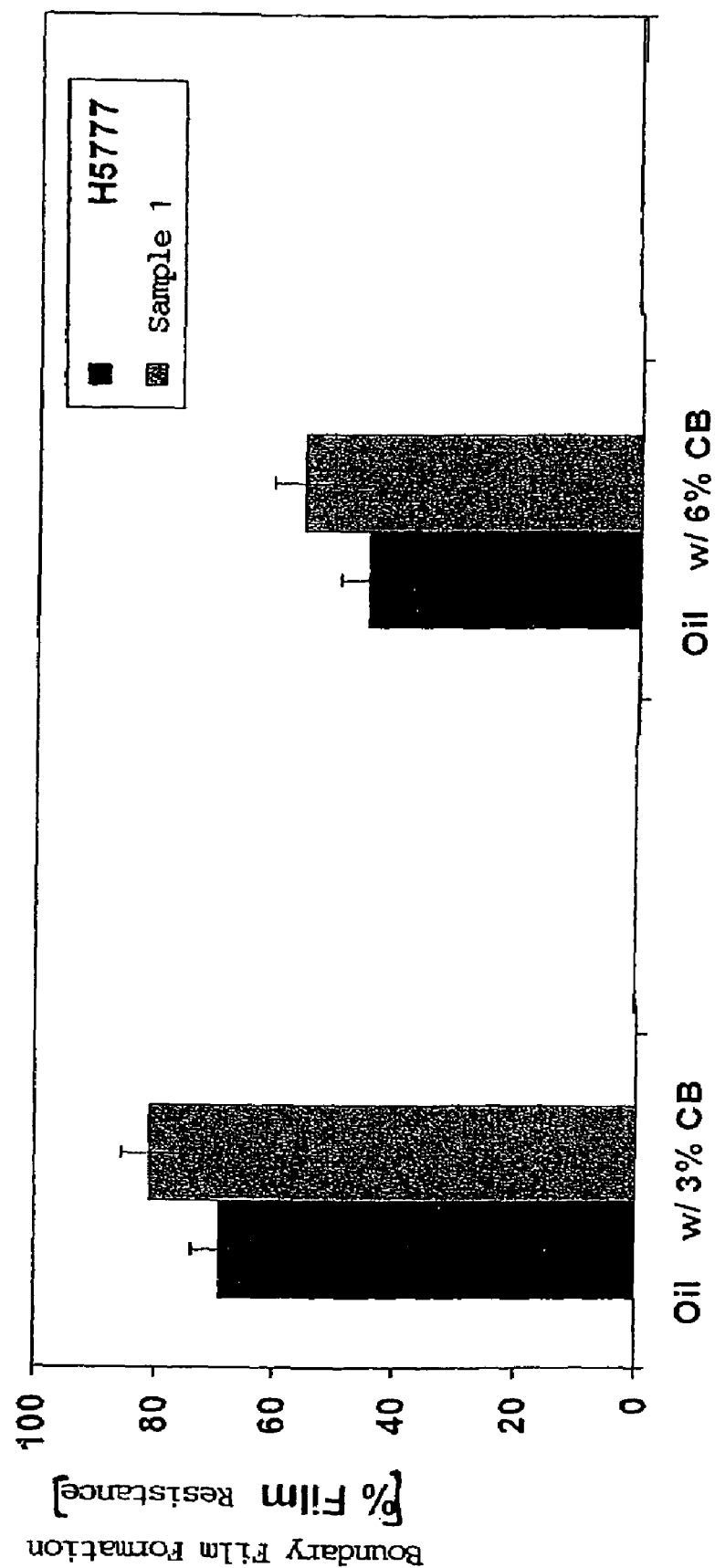
FIG. 2 is bar graph indicating the presence and extent of boundary film formation, as measured in terms of percent film resistance, of lubricating oils containing the unique VI modifier additives according to an embodiment of the present disclosure as compared to those of a lubricating oil containing a commercial VI modifier additive in High Frequency Reciprocating Rig (HFFR) tests conducted at several different soot ("carbon black") levels.

Boundary friction properties of the test fluids were measured using a High Frequency Reciprocating Rig (HFRR) with oils containing carbon black using the method described in SAE 2002-01-2793. The HFRR generally operates by oscillating a ball across a plate in a sample cell containing 1-2 mL of sample. The frequency of oscillation, path length that the ball travels, load applied to the ball and test temperature can be controlled. By controlling these parameters, the boundary frictional properties of the fluid can be assessed. The HFFR tests were conducted at 3% and 6% carbon black levels in the lubrication oils. Carbon black was used to mimic engine exhaust soot. The results are shown in FIG. 2. The inventive lubricating compositions have larger percent resistance values in HFFR tests than lubricants modified with HiTEC® 5777 at both soot levels, indicating that the inventive lubricating compositions formed relatively thicker and thus superior boundary films.

While the invention has been particularly described with specific reference to particular process and product embodiments, it will be appreciated that various alterations, modifications and adaptations may be based on the present disclosure, and are intended to be within the spirit and scope of the present disclosure as defined by the following claims.

What is claimed is:

1. A method of lubricating an internal combustion engine wherein said method comprises adding to a crankcase of said engine
a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product, wherein the lubricating oil composition achieves a weighted demerits-1P (WDP) value of less than 250, a top land carbon (TLC) value of less than 20, and a top groove carbon (TGC) value of less than 20, in the Caterpillar 1P Test Method.

2. A method of lubricating an internal combustion engine wherein said method comprises adding to a crankcase of said engine
a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product, wherein the lubricating oil composition forms a boundary film having a percent film resistance value of about 80 to about 95 measured in a High Frequency Reciprocating Rig (HFRR) test conducted at a 3% soot level, wherein the percent resistance is determined from an oil resistivity value measured according to ASTM D 1169.

3. A method of lubricating an internal combustion engine wherein said method comprises adding to a crankcase of said engine
a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product, wherein the lubricating oil composition forms a boundary film having a percent film resistance value of about 50 to about 70 as measured in a High Frequency Reciprocating Rig (HFRR) test conducted at a 6% soot level, wherein the percent resistance is determined from an oil resistivity value measured according to ASTM D 1169.

4. A method of lubricating an internal combustion engine wherein said method comprises adding to a crankcase of said engine
a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product, wherein the lubricating oil composition has a kinematic viscosity at 100° C. (KV100) in the range of 9.3 to 21.8 cSt.

5. The method of claim 4, wherein the lubricating oil composition has a kinematic viscosity at 100° C. (KV100) in the range of 15 to 16.3 cSt.

6. A method of lubricating an internal combustion engine wherein said method comprises adding to a crankcase of said engine
a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate;

dissolving the pelletized copolymer intermediate in a neutral oil to form a dissolved copolymer intermediate; and reacting the dissolved copolymer intermediate with an amine to provide a grafted olefin copolymer additive reaction product, wherein the lubricating oil composition achieves a viscosity increase of less than 10 cSt at 100° C. at a soot level of up to 6.0% in the Mack T-11 test.

7. A method of lubricating an internal combustion engine wherein said method comprises adding to a crankcase of said engine a lubricating oil composition comprising a major amount of an oil of lubricating viscosity and a minor amount of an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product, wherein the internal combustion engine comprises a cooled exhaust gas recirculation (EGR) equipped heavy duty diesel engine.

8. A lubricated engine comprising a cooled exhaust gas recirculation system, whereby exhaust gases comprising soot generated in the combustion in the engine of fuel contact a lubricating oil used to lubricate said engine, wherein said lubricating oil comprises: a base oil, and at least one dispersant viscosity index improver comprising an additive reaction product prepared by a method comprising reacting an acylating agent with an olefin copolymer having a number average molecular weight greater than about 1,000 in the presence of a free radical initiator and said method being essentially free of hydrocarbon solvent in an extruder to provide a copolymer intermediate comprising an acylated olefin copolymer having a degree of grafting (DOG) of the acylating agent on the olefin copolymer of at least 0.5 wt. %, and wherein the copolymer intermediate is reduced in molecular weight; vacuum stripping unreacted components; pelletizing the copolymer intermediate to form a pelletized copolymer intermediate; dissolving the pelletized copolymer intermediate in a neutral oil to form a dissolved copolymer intermediate; and reacting the dissolved copolymer intermediate with an amine to provide a grafted olefin copolymer additive reaction product in an amount sufficient to reduce the amount of oil thickening of the lubricating oil as compared to use of the lubricating oil without the additive reaction product.

9. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

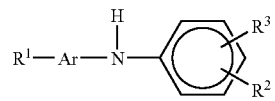

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$—)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

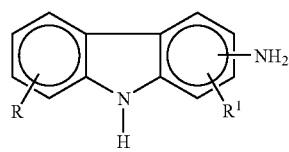

in which R and $R^1$ represent hydrogen or an alkyl, alkenyl, or alkoxyl radical having from 1 to 14 carbon atoms, (c) an aminoindole represented by the formula:

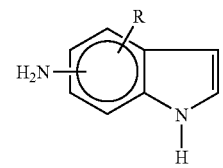

in which R represents hydrogen or an alkyl radical having from 1 to 14 carbon atoms, (d) an amino-indazolinone represented by the formula:

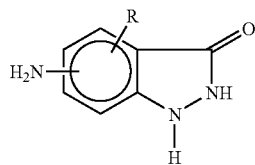

in which R is hydrogen or an alkyl radical having from 1 to 14 carbon atoms, (e) an aminomercaptotriazole represented by the formula:

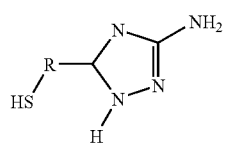

in which R can be absent or can be $C_1$-$C_{10}$ linear or branched hydrocarbon selected from the group consisting of alkyl, aryl, alkaryl, or arylalkyl, (f) an aminopyrimidine represented by the formula:

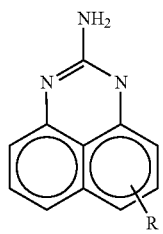

in which R represents hydrogen or an alkyl or alkoxyl radical having from 1 to 14 carbon atoms, wherein the lubricating oil composition achieves a weighted demerits-1P (WDP) value of less than 250, a top land carbon (TLC) value of less than 20, and a top groove carbon (TGC) value of less than 20, in the Caterpillar 1P Test Method.

10. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

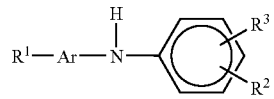

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$-)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

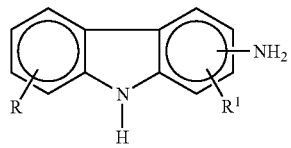

in which R and $R^1$ represent hydrogen or an alkyl, alkenyl, or alkoxyl radical having from 1 to 14 carbon atoms, (c) an aminoindole represented by the formula:

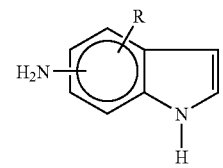

in which R represents hydrogen or an alkyl radical having from 1 to 14 carbon atoms, (d) an amino-indazolinone represented by the formula:

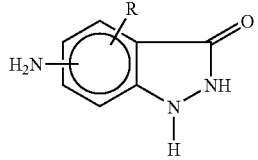

in which R is hydrogen or an alkyl radical having from 1 to 14 carbon atoms, (e) an aminomercaptotriazole represented by the formula:

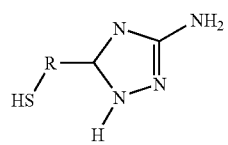

in which R can be absent or can be $C_1$-$C_{10}$ linear or branched hydrocarbon selected from the group consisting of alkyl, aryl, alkaryl, or arylalkyl, (f) an aminopyrimidine represented by the formula:

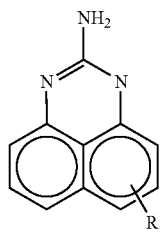

in which R represents hydrogen or an alkyl or alkoxyl radical having from 1 to 14 carbon atoms, wherein the lubricating oil composition forms a boundary film having a percent film resistance value of about 80 to about 95 measured in a High Frequency Reciprocating Rig (HFRR) test conducted at a 3% soot level, wherein the percent resistance is determined from an oil resistivity value measured according to ASTM D 1169.

11. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

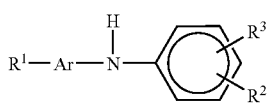

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$-)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

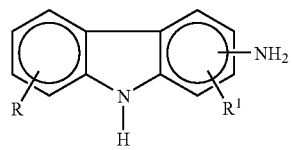

in which R and $R^1$ represent hydrogen or an alkyl, alkenyl, or alkoxyl radical having from 1 to 14 carbon atoms, (c) an aminoindole represented by the formula:

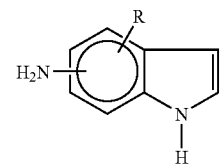

in which R represents hydrogen or an alkyl radical having from 1 to 14 carbon atoms, (d) an amino-indazolinone represented by the formula:

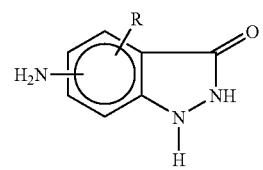

in which R is hydrogen or an alkyl radical having from 1 to 14 carbon atoms, (e) an aminomercaptotriazole represented by the formula:

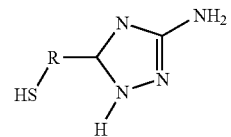

in which R can be absent or can be $C_1$-$C_{10}$ linear or branched hydrocarbon selected from the group consisting of alkyl, aryl, alkaryl, or arylalkyl, (f) an aminopyrimidine represented by the formula:

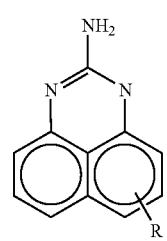

in which R represents hydrogen or an alkyl or alkoxyl radical having from 1 to 14 carbon atoms, wherein the lubricating oil composition forms a boundary film having a percent film resistance value of about 50 to about 70 as measured in a High Frequency Reciprocating Rig (HFRR) test conducted at a 6% soot level, wherein the percent resistance is determined from an oil resistivity value measured according to ASTM D 1169.

12. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

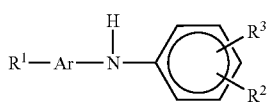

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$-)$_m$—$NH_2$, —($CH_2$)$_n$—$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

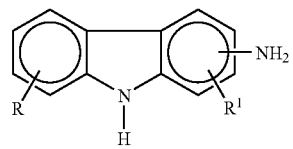

in which R and $R^1$ represent hydrogen or an alkyl, alkenyl, or alkoxyl radical having from 1 to 14 carbon atoms, (c) an aminoindole represented by the formula:

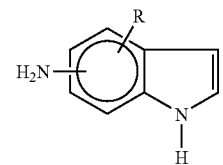

in which R represents hydrogen or an alkyl radical having from 1 to 14 carbon atoms, (d) an amino-indazolinone represented by the formula:

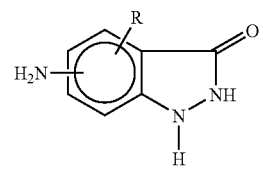

in which R is hydrogen or an alkyl radical having from 1 to 14 carbon atoms, (e) an aminomercaptotriazole represented by the formula:

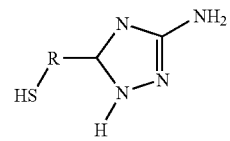

in which R can be absent or can be $C_1$-$C_{10}$ linear or branched hydrocarbon selected from the group consisting of alkyl, aryl, alkaryl, or arylalkyl, (f) an aminopyrimidine represented by the formula:

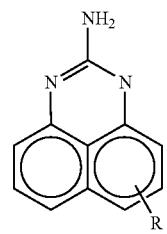

in which R represents hydrogen or an alkyl or alkoxyl radical having from 1 to 14 carbon atoms, wherein the lubricating oil composition has a kinematic viscosity at 100° C. (KV100) in the range of 9.3 to 21.8 cSt.

13. The method of claim 12, wherein the lubricating oil composition has a kinematic viscosity at 100° C. (KV 100) in the range of 15 to 16.3 cSt.

14. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

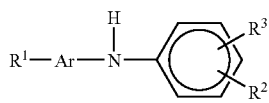

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$-)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

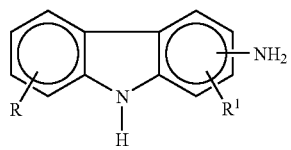

in which R and $R^1$ represent hydrogen or an alkyl, alkenyl, or alkoxyl radical having from 1 to 14 carbon atoms, (c) an aminoindole represented by the formula:

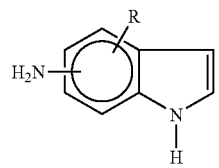

in which R represents hydrogen or an alkyl radical having from 1 to 14 carbon atoms, (d) an amino-indazolinone represented by the formula:

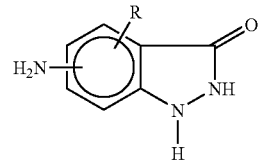

in which R is hydrogen or an alkyl radical having from 1 to 14 carbon atoms, (e) an aminomercaptotriazole represented by the formula:

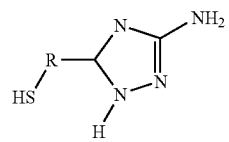

in which R can be absent or can be $C_1$-$C_{10}$ linear or branched hydrocarbon selected from the group consisting of alkyl, aryl, alkaryl, or arylalkyl, (f) an aminopyrimidine represented by the formula:

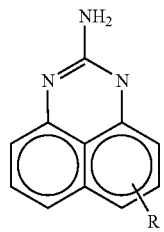

in which R represents hydrogen or an alkyl or alkoxyl radical having from 1 to 14 carbon atoms, wherein the lubricating oil composition achieves a viscosity increase of less than 10 cSt at 100° C. at a soot level of up to 6.0% in the Mack T-11 test.

15. A method of lubricating a transmission of an automotive vehicle having a transmission wherein said method comprises lubricating said transmission of said vehicle with a lubricating oil composition comprising a major amount of an oil of lubricating viscosity and a minor amount of an additive reaction product prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

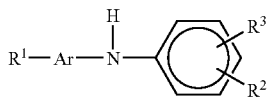

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$—)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

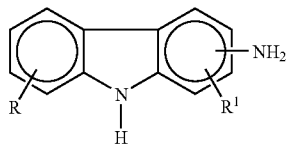

in which R and $R^1$ represent hydrogen or an alkyl, alkenyl, or alkoxyl radical having from 1 to 14 carbon atoms, (c) an aminoindole represented by the formula:

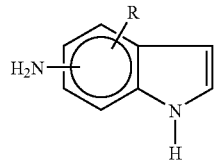

in which R represents hydrogen or an alkyl radical having from 1 to 14 carbon atoms, (d) an amino-indazolinone represented by the formula:

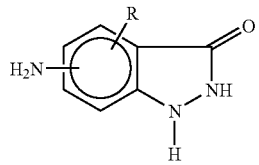

in which R is hydrogen or an alkyl radical having from 1 to 14 carbon atoms, (e) an aminomercaptotriazole represented by the formula:

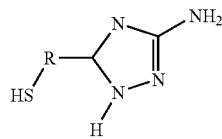

in which R can be absent or can be $C_1$-$C_{10}$ linear or branched hydrocarbon selected from the group consisting of alkyl, aryl, alkaryl, or arylalkyl, (f) an aminopyrimidine represented by the formula:

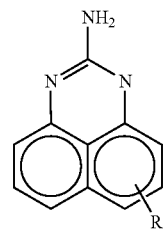

in which R represents hydrogen or an alkyl or alkoxyl radical having from 1 to 14 carbon atoms, wherein the internal combustion engine comprises a cooled exhaust gas recirculation (EGR) equipped heavy duty diesel engine.

16. A lubricated engine comprising a cooled exhaust gas recirculation system, whereby exhaust gases comprising soot generated in the combustion in the engine of fuel contact a lubricating oil used to lubricate said engine, wherein said lubricating oil comprises: a base oil, and at least one dispersant viscosity index improver prepared by a method comprising (A) reacting an olefin copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin, and from about 0 to 15 mole percent of said polyene, said copolymer having a number average molecular weight ranging from 1,000 to 500,000, with an olefinic carboxylic acid acylating agent, said process comprising heating said copolymer to a molten condition at a temperature in the range of 60° C. to 240° C., grafting in an extruder or a mixing device, said olefinic carboxylic acylating agent onto said copolymer, optionally subsequently reducing the molecular weight of said copolymer, thereby producing a grafted, acylated olefin copolymer and having at least 1.0 molecules of said carboxylic acid acylating agent grafted onto each molecule of said olefin copolymer, and (B) reacting said grafted, acylated olefin copolymer in (A) with an amine compound selected from the group consisting of:

(a) an N-arylphenylenediamine represented by the formula:

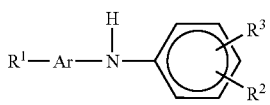

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl, $R^2$ is (—$NH_2$, —(NH($CH_2$)$_n$-)$_m$—$NH_2$, —($CH_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

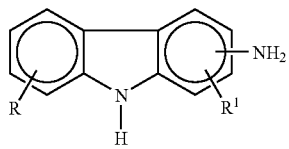

in which R and $R^1$ represent hydrogen or an alkyl, alkenyl, or alkoxyl radical having from 1 to 14 carbon atoms,
(c) an aminoindole represented by the formula:

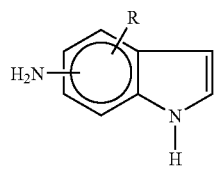

in which R represents hydrogen or an alkyl radical having from 1 to 14 carbon atoms,
(d) an amino-indazolinone represented by the formula:

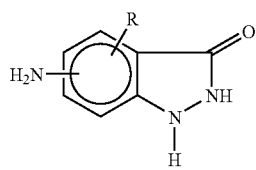

in which R is hydrogen or an alkyl radical having from 1 to 14 carbon atoms, (e) an aminomercaptotriazole represented by the formula:

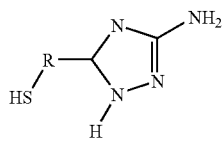

in which R can be absent or can be $C_1$-$C_{10}$ linear or branched hydrocarbon selected from the group consisting of alkyl, aryl, alkaryl, or arylalkyl,
(f) an aminopyrimidine represented by the formula:

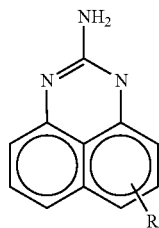

in which R represents hydrogen or an alkyl or alkoxyl radical having from 1 to 14 carbon atoms in an amount sufficient to reduce the amount of oil thickening of the lubricating oil as compared to use of the lubricating oil without the additive reaction product.

* * * * *